United States Patent
Waling et al.

[11] 3,818,731
[45] June 25, 1974

[54] NUT LOCK

[75] Inventors: Thomas A. Waling, Milford; Edwin J. Waling, White Lake Twp., both of Mich.

[73] Assignee: Waling Tool Company, Dearborn, Mich.

[22] Filed: Jan. 16, 1973

[21] Appl. No.: 324,204

[52] U.S. Cl. .................................. 70/232, 70/259
[51] Int. Cl. ........................................... F16b 41/00
[58] Field of Search ............................ 70/259, 232

[56]  References Cited
UNITED STATES PATENTS

| | | | |
|---|---|---|---|
| 1,577,292 | 3/1926 | Obreiter | 70/232 X |
| 2,043,872 | 6/1936 | Wise | 70/232 |
| 2,315,245 | 3/1943 | Collier | 70/232 |
| 3,696,646 | 10/1972 | Loscalzo | 70/232 X |

*Primary Examiner*—George H. Krizmanich
*Attorney, Agent, or Firm*—Cullen, Settle, Sloman & Cantor

[57] ABSTRACT

An improved lock for preventing unauthorized removal of a nut. In one embodiment, a plate having a flange at one edge is locked in a housing. An integral nut and retainer are journaled in an aperture in the plate with the nut and retainer on opposite sides thereof. The nut is threaded on a stud and the housing locked in place to preclude access to the nut. In another embodiment, such as where a cable having a coupling member is to be protected, the plate has an aperture shaped to receive the coupling member. The plate is locked in a housing which has an aperture through which the cable passes.

7 Claims, 14 Drawing Figures

PATENTED JUN 25 1974 3,818,731
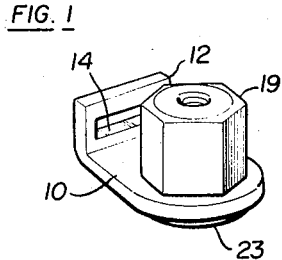
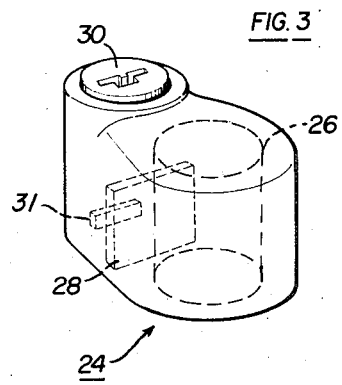
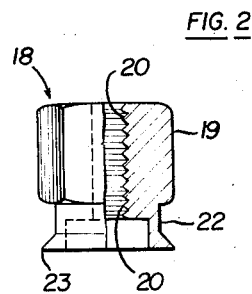
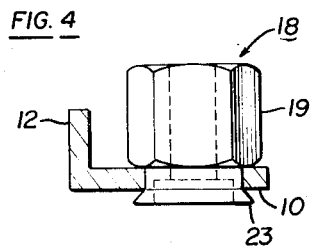
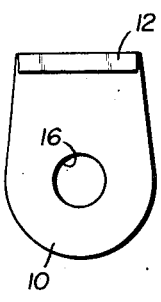
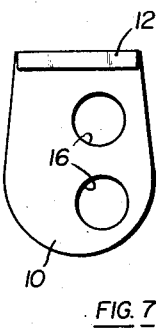
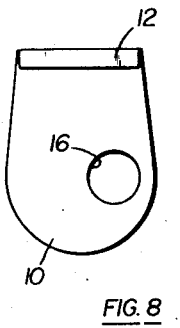
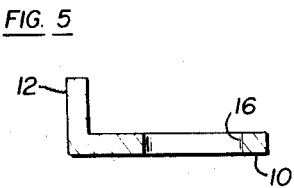
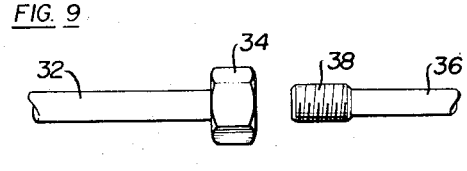
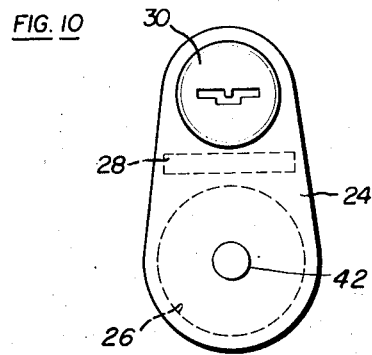
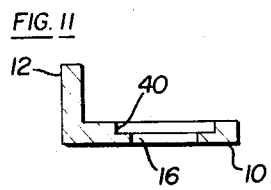
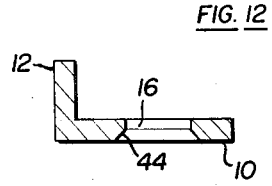
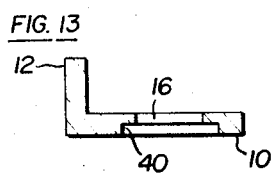
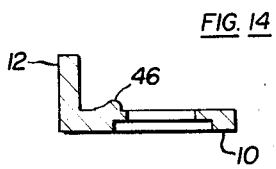

3,818,731

NUT LOCK

BACKGROUND OF THE INVENTION

This invention relates to an improved lock for preventing the unauthorized removal of a nut.

When a spare tire is exposed on a vehicle, it is often desired to securely lock the lug nut in place to prevent theft of the tire. One shortcoming with the existing nut locks is that upon deliberate removal of the lock and removal of the lug nut, the lug nut may be easily lost until another spare tire is put in place.

In other environments, such as in the rental automobile business where the rental charge is based upon mileage, it is desired to securely lock the speedometer cable to both the speedometer head and the transmission to prevent the unauthorized removal of the cable during automobile rental. It is thus desirable to provide a lock which prevents the unauthorized loosening of a coupling member of the type which couples a speedometer cable to either the speedometer head or the transmission.

SUMMARY OF THE INVENTION

It is an object of the present invention to provide an improved nut lock wherein the nut is permanently fastened to the removable portion of the lock.

It is another object of the present invention to provide an improved lock which may secure a coupling member in place wherein the coupling member secures a conduit or the like to a fitting.

These objects are accomplished in an improved lock according to the present invention which includes, in a first embodiment, a housing having a movable locking member, and an apertured plate having a flange at one edge thereof. The flange includes a slot to receive the locking member from the housing, and an integral nut and retainer is journaled in the aperture of the plate. The retainer and the nut are on opposite sides of the plate.

In a second embodiment, the plate has an aperture to receive a coupling member and the housing has an aperture so that a cable or the like may pass through both the plate and housing.

BRIEF DESCRIPTION OF THE DRAWINGS

The foregoing objects of the present invention, together with other objects and advantages which may be attained by its use, will become more apparent upon reading the following detailed description taken in conjunction with the drawings.

In the drawings, wherein like reference numerals identify corresponding parts:

FIG. 1 is a perspective view of the removable plate of a nut lock according to the principles of the present invention;

FIG. 2 is an enlarged view, partly in cross-section, of the integral nut and retainer of the present invention;

FIG. 3 is a perspective view of the lock housing of the present invention;

FIG. 4 is a side elevation of the removable plate of the lock of FIG. 1;

FIG. 5 is an illustration of FIG. 4 with the nut and retainer removed;

FIGS. 6, 7 and 8 are plan views of three different modifications to the removable plate of the lock according to the present invention;

FIG. 9 is an exploded view of a coupling member for securing a connector to a fitting;

FIG. 10 is a plan view of a housing for use with the coupling member of FIG. 9;

FIG. 11 is a side elevation of the removable plate of the lock for use with the coupling member of FIG. 9; and FIGS. 12, 13 and 14 are different modifications for the removable plate of the lock according to the present invention.

DETAILED DESCRIPTION OF THE INVENTION

Referring first to FIG. 1, there is illustrated the removable portion of the lock of the present invention including an elongated plate 10 having a flange 12 at one edge thereof. The flange has a slot 14 to accept a locking member as will be explained hereinafter.

The plate 10 includes an aperture 16 so that an integral nut and retainer 18 may be journaled in the plate.

With reference to FIG. 2, the integral nut and retainer 18 is illustrated as including a nut portion 19 having internal threads 20, a neck portion 22 also threaded as at 20 and a retainer 23. The retainer 23, which may be a lip or outward radial flange, is formed after the nut and neck are passed through the aperture 16. The retainer portion 23 may be formed by hammering or otherwise spreading the bottom portion of the neck 22.

A housing 24 for the lock includes a first cavity 26 for receiving the nut, a channel or passageway 28 for receiving the flange 12 and a lock 30, which may be operated by a key. Operation of a key or otherwise rotating the lock 30 serves to move a pivotable locking member 31.

In operation, with the integral nut and retainer secured to the plate as in FIG. 4, the nut 19 may be secured down against a stud which has been previously passed through the wheel of a spare tire. Once the nut is tightened, the housing is slipped into place with the cavity 26 preventing access to the nut. Insertion of the key into the lock 30 and rotation of the locking member 31 causes the locking member to engage the slot 14 in the flange 12.

Depending upon the particular environment to be used, the physical location of the aperture 16 with respect to the plate 10 may vary. For example, FIG. 8 shows an aperture 16 off center with respect to the plate 10. In addition, FIG. 7 illustrates the use of a plurality of apertures. Obviously, the shape of the cavity portion 26 of the housing 24 must be changed to receive either an off center nut or a plurality of nuts.

FIGS. 4 and 5 illustrate side elevations of the plate and integral nut and retainer combination, FIG. 4, and the plate alone as in FIG. 5.

If it is necessary to secure a cable or connector such as a speedometer cable to a fitting by the use of a coupling member, the coupling member may be secured to prevent unauthorized access according to the principles of this invention.

With reference to FIG. 9, there is illustrated a cable or other conduit 32 including a nut or connector 34 which may be utilized to secure the cable to a fitting 36.

The fitting 36 is threaded as at 38 so that the nut 34 may be secured thereto.

A plate 10 as in FIG. 11 is placed over the cable. The plate 10 has an aperture 16 with a recess 40 on one side of the plate, The recess 40 is adapted to fit over one end of the nut 34 and serves to prevent inadvertent loosening of the nut. A housing 24 as in FIG. 10 having an additional aperture 42 is placed over the fitting 36 and then the nut 34 is tightened onto the fitting.

Thereafter, the housing and plate are secured together by inserting the flange 12 within the channel 28. Then the locking member 31 is actuated by turning the lock 30.

With reference to FIGS. 12 and 13, there are illustrated additional modifications according to the present invention. For example, the aperture 16 may be countersunk as at 44 in FIG. 12 and the recess 40 may be on the opposite side of the plate from the recess shown in FIG. 11, as, for example, in FIG. 13.

Furthermore, the plate may include a bump or projection 46 to provide and additional locking with respect to the nut 19.

The foregoing is a description of various embodiments of the present invention but should not be read in a restrictive sense but only as explaining the underlying concepts. The invention may be further developed within the scope of the following claims.

What is claimed is:

1. In a nut lock including a housing having a channel and a movable locking member movable into and out of said channel; the improvement comprising:
   an apertured plate having a flange at one edge thereof for insertion into said channel; and a slot in said flange to receive said locking member, and
   a one piece nut and retainer journaled in the aperture of said plate,
   said retainer and said nut being disposed on opposite sides of said plate.

2. The nut lock of claim 1 wherein said plate includes a raised projection for further locking with said nut.

3. The improvement of claim 1 wherein said aperture is off-center with respect to said plate.

4. The improvement of claim 1 and further including a plurality of apertures in said plate.

5. A lock for preventing the unauthorized removal of a coupling member, said coupling member adapted to be secured to a threaded fitting comprising:
   an apertured plate, said aperture including a recess on one side of the plate for retaining the coupling member, and a slot for receiving a movable locking member; and
   a housing disposed over said coupling member and having an internal movable locking member to engage the slot in said plate for locking the housing to said plate;
   said housing having an opening aligned with the aperture in said plate for receiving the threaded fitting therethrough while precluding access to the coupling member.

6. The lock of claim 5 wherein said recess is countersunk.

7. The lock of claim 5 wherein said coupling member is journaled in said aperture.

* * * * *